United States Patent Office 3,467,612
Patented Sept. 16, 1969

3,467,612
TEXTILE-TREATING COMPOSITIONS CONTAINING FLUORINATED ACRYLIC POLYMERS AND POLYVALENT METAL SALTS OF WEAK ACIDS
Domenick Donald Gagliardi, 5454 Post Road, East Greenwich, R.I. 02818
No Drawing. Continuation-in-part of application Ser. No. 410,268, Nov. 10, 1964. This application May 12, 1967, Ser. No. 637,893
Int. Cl. C08f 29/16; D06m 15/32
U.S. Cl. 260—29.6        21 Claims

ABSTRACT OF THE DISCLOSURE

Stable compositions for rendering textiles water and stain repellent and resistant to soiling comprising a perfluoroacrylic polymer emulsion and a polyvalent metal salt of a water-soluble weak acid.

---

This application is a continuation-in-part of application Ser. No. 410,268 filed Nov. 10, 1964, now abandoned.

The present invention relates to compositions and methods particularly suitable for the treatment of textile and similar materials and to the resulting products having improved properties thereby. More particularly, the present invention relates to unitary aqueous compositions which impart to textiles and other materials increased repellency to wetting or soiling.

The textile industry for a long time has sought a process for treating textile materials which can, in addition to rendering textiles water repellent, render textiles oil repellent, stain repellent to both oil and water borne stains and soil repellent. Heretofore, a number of compositions have been available which are capable of providing water repellency or oil repellency, but no composition has been available which is capable of providing oil, soil, stain and water repellency. In particular, a number of compositions are available which are capable of providing a water repellent fabric, but treatment with such compositions renders the fabric more susceptible to either oil staining or dry soil staining since the compositions have a far greater affinity for such soils than the untreated fabrics. Accordingly, the fabric treating compositions which are presently available are far from satisfactory if it is desired to provide textiles or other materials with a finish which is not only water repellent but also repellent to oil, water and oil borne stains and dried soils.

Earliest attempts at water-proofing involved coating textiles with various compositions such as rubber, linseed oil-rubber mixtures, synthetic dopes, and other bizarre compositions which formed a continuous coating on the woven material and prevented water penetration.

In the late 1930's a series of paraffin wax emulsions were developed which produced water repellency without affecting textile porosity. These, however, were not durable treatments. Further developments led to the use of quaternary ammonium compounds, e.g., octadecyl oxymethyl pyridinium chloride, and particularly fiber reactive ones. In addition other materials suggested included silicones, hydrophobic resins and octadecyl ketene dimer among others.

In the 1950's there was a shift toward emphasizing resistance to spots and stains, and this led to the development of perfluoroalkyl acrylate polymers, see U.S. 2,628,958). A major deficiency of these earlier polymers was a lack of resistance to dynamic soiling, and, as a matter of fact, fabrics so treated appear to attract more "particulate soil" than untreated fabrics.

It has more recently been proposed to use perfluorocarboxylic acids in compositions for treating textiles, and particularly, reaction products with polyvalent metal complexes or salts to produce a water or oil repellent finish. The techniques suggested require successive applications of one material and then the other, and the repellencies are inadequate for most commercial purposes. In addition such a two-step mordanting process is time consuming, inefficient and costly.

It has now been discovered that a specific class of perfluoroacrylic emulsion polymers in combination with certain specified polyvalent metal salts in an aqueous medium is not only a stable combination but is outstanding in producing an oil and water repellent finish which is also resistant to dry soiling.

It is therefore an object of this invention to provide new and outstanding textile treating compositions which produce unique oil and water repellency.

It is another object of this invention to provide new compositions which produce outstanding resistance to particulate soiling when used on textiles.

Another object of this invention is to provide new, useful and outstanding stable compositions of perfluoroacrylic polymer emulsions and polyvalent metal salts and particularly salts of water-soluble, weak acids.

Still another object of this invention is to provide processes for treating textiles to render them repellent to wetting, soiling and staining and resistant to soiling by particulate soils.

Other objects will appear hereinafter as the description proceeds.

In accordance with the present invention it has now been discovered that materials may be treated with an aqueous mixture of a perfluoroacrylic based emulsions polymer wherein substantially all and preferably at least 70% of the hydrogen atoms have been replaced by fluorine atoms and a polyvalent metal salt of a water-soluble weak acid which when dried forms a surface or finish which is particularly repellent to water, oils and oil and water borne stains and is resistant to soiling by particulate soils in addition to having other desirable properties.

The perfluoro acrylic based emulsion polymers of the present invention relate to esters having a composition corresponding to the formula:

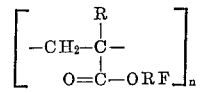

where R is H or $CH_3$, RF is a fluoro alkyl ($C_4$ to $C_{30}$), alkaryl cycloalkyl, hetero or aryl radical wherein at least 70% of the H has been replaced by fluorine and may contain N or S atoms in the substituent groups and $n$ is an integer of 10 to 1000. These compounds in combination with the heavy metal salts of the contemplated weak acids on drying form in situ a unique and complex derivative or product on the fibers so as to render them highly hydrophobic, oleophobic, and resistant thereby to staining and to soiling.

The perfluoro acrylic based emulsion polymers of the present invention may be thermoplastic or thermosetting and are typified by the compounds disclosed in U.S. Patent 2,628,958 and may be prepared by the methods disclosed therein. Typical of these compounds are perfluoro butyl acrylate, perfluoro octa-acrylate, perfluoro omega hydrobutyl acrylate, perfluoro heptyl acrylate, and perfluoro undecanilic methacrylate, the octa-methacrylates, perfluorocyclohexylacrylate, perfluorotetrahydrofurfuryl acrylate and the like.

The polyvalent metal salts of water-soluble weak acids which may be employed in the present invention are salts of weak acids having an ionization constant of $1 \times 10^{-2}$ to $1 \times 10^{-10}$. Preferably, the di-, tri- and tetravalent metal salts such as zirconium, aluminum, zinc, copper, cobalt and chromium are employed and most preferably the zirconium and aluminum salts. Typical of the aluminum and zirconium salts which are preferably employed in the present invention are aluminum formate, aluminum acetate, aluminum lactate, aluminum chlorhydroxide, zirconium acetate, zirconium oxychloride, zirconium chlorhydroxide and zirconium glycolate.

The combination of the perfluoro acrylic based emulsion polymer and a heavy metal salt of a weak acid is applied to the fibrous material in any suitable manner effective to form said repellent and resistant surface or finish. In general, the mixture is applied in the form of a liquid comprising an aqueous dispersion of these ingredients so as to impregnate or uniformly treat the material followed by drying or curing. Depending upon the particular method of application, the concentration of the treating liquid may vary widely. For example, the treating solution or dispersion may contain from about 1 up to 20% by weight of solids, preferably from about 1 to 10% and more preferably 1 to 5%. The composition may be applied by spraying, dipping, brushing, roll-transfer, knife-coating, padding, exhaustion, soaking in a bath with or without agitation, or in any other suitable manner.

The preferred method of applying these ingredients is to form a bath of an aqueous solvent medium containing these ingredients in solution or fine dispersion, and dip or soak the fabric for a predetermined time correlated with the concentration of the bath. The concentration of the ingredients in the bath is not critical provided sufficient amounts are used to result in the desired pick-up of the ingredients on the fabric so as to render it resistant to wetting and staining after drying. In general, the ratio of perfluoro thermoplastic acrylic based emulsion polymer to metal salt of a weak acid is from about 10:90 to 90:10 by weight. In the bath, it is preferred that the perfluoro acrylic based emulsion polymer is used in an amount of 1 to 10% by weight, more preferably 1 to 5% and the metal salt of a weak acid in an amount of 1 to 10% and preferably 1 to 5% with particularly effective results where the ratio of the polymer to salt is at least 1:1 by weight. It has been found also that the total bath concentration may be comparatively low e.g. 1% of the perfluoro acrylic based emulsion polymer and 1% of the metal salt. Such comparatively low concentrations are generally insufficient for the ingredients to exert any appreciable repellent effect if used individually. Other materials such as solubilizing agents or solvents may be present in the bath to assist in dissolving or solubilizing the ingredients.

The textile fabric is immersed in the liquid for a sufficient period of time to form a suitable repellent surface. In general, it is preferred that immersion be at room temperature, depending upon the concentration, weight of material and desired pick-up.

The ingredients may be admixed in any suitable manner in concentrated form so as to form a liquid, paste or dry concentrate which can be readily diluted with water to form the treating solution for impregnating the fabric. The ingredients may be admixed in water up to the limit of their solubilities so as to form a concentrated or saturated solution, which can then be added to water to form a dilute solution. The liquid concentrates may be in the form of a suitable suspension, emulsion and paste-like product. While the ingredients may be added separately to the solvent medium to form a treating bath, it is advantageous to combine such ingredients in a suitable package so that they may be added to the bath as a single product in fixed concentration. Such compositions may be prepared in any suitable container or package such as in a metal or plastic container for adding a liquid or aerosol spray or in a water soluble plastic envelop containing one or both of the ingredients already admixed or in separate compartments.

After treatment, the fabric is removed from the bath and then dried in any suitable manner. It has been found that the treated fabric may be dried by exposure to normal atmospheric air currents at normal room temperature which permits ready fixation and curing of the product on the fabric. Alternatively, the coated substrate may be heat treated by any suitable drying equipment. It may be dried by ironing or by application of heated air or infra-red rays. Temperatures up to about 400° F., e.g. 250 to 300° F. may be employed. In general, the drying time is roughly inversely proportional to the temperature and may be from a few seconds to several hours, e.g. 30 seconds to 1 hour. The combined factors of temperature and time depend upon the particular substrate used and the pick-up on the fabric.

An important advantage of the textile treatment in accordance with the present invention is that no unusually high temperatures are required for treatment or drying, or are catalysts required to convert the films or impregnated product in situ into an insolubilized network in combination with the fibers so as to achieve the repellent finish.

The composition has been found to be particularly effective for the treatment of cotton and other cellulosic materials to produce highly effective water, stain, soil and oil repellent fabrics. Other fabrics including rayon, viscose, nylon, Dacron, wool and other natural and synthetic fibrous materials may be treated similarly to achieve the repellent effect. Other porous materials such as paper, cardboard, leather and the like may also be treated. The treatment may be applied to other suitable surfaces for a wide variety of purposes. Included therein are applications to the surface of metals, glass, porcelain and other vitreous materials, plastic articles in pigmented or clear form.

If desired, these materials may be used in combination with other ingredients to achieve particular desired effects. Thus, there may be added to the bath suitable buffering or pH modifying agents such as sodium acetate in minor amount to adjust the pH to a desired level provided that the materials are not precipitated from solution. Materials intended to give an improved feel, crease resistance and anti-static effects or the like may be added in compatible amounts also. If desired, suitable amounts of compatible pigment, extender, filler, delustrant, softeners, glossing agents, starches, bluing agents, optical brighteners or the like may be incorporated as desired.

The following examples are further illustrative of the nature of the present invention, and all amounts specified are by weight unless otherwise indicated.

As used hereinafter the spray rating values were obtained by the American Association of Textile Chemists & Colorists Standard Test Method 22–1952. The oil repellency values were obtained by the Minnesota Mining and Mfg. Co. Oil repellency Test: 3M Textile Chemicals, Appendix A Test Methods, page 1, publ. 1958.

EXAMPLE 1

Samples of cotton fabrics were padded through aqueous dispersions containing 1% by weight of a perfluorooctyl acrylate polymer and varying heavy metal salts. After drying 5 minutes at 300° F., the following results were obtained:

| Percent Salt Added | Percent Repellency | |
|---|---|---|
| | Water | Oil |
| None | 70 | 0+ |
| 1% Aluminum acetate | 90 | 70 |
| 1% Aluminum formate | 90 | 80 |
| 1% Aluminum chlorhydroxide | 80 | 100 |
| 1% Zirconium acetate | 90 | 100 |
| 1% $NH_3Zr$ Carbonate | 80 | 70 |
| 0.5% $ZrOCl_2 \cdot 8H_2O$ | 80 | 90 |
| 0.5% $Zr(OH)Cl \cdot 8H_2O$ | 90 | 100 |

EXAMPLE 2

Samples of cotton fabric were agitated in a dispersion containing 3% (on fabric weight) of perfluorooctyl acrylate polymer and 7.5% of aluminum acetate. After 30 minutes at 120° F., the samples were dried under varying conditions. The following repellencies were obtained:

| Drying | Percent Repellency | |
|---|---|---|
| | Water | Oil |
| R. T. | 0 | 80 |
| 5'/300° F. | 80 | 90 |
| Ironed/400° F. | 70 | 90 |
| Control (no metal salt) | 0 | 0 |

EXAMPLE 3

Samples of cotton fabric were padded through aqueous dispersions of perfluorooctyl acrylate polymer and aluminum chlorhydroxide then dried 5 minutes at 300° F. The following repellencies were obtained:

| Percent Fluorochemical | Percent Al(OH)$_2$Cl | Percent Repellancy | |
|---|---|---|---|
| | | Water | Oil |
| (A) 0.1 | (¹) | 0 | 0 |
| (B) 0.5 | (¹) | 0 | 0 |
| (C) 1.0 | (¹) | 80 | 0 |
| (D) 0.1 | 1 | 70 | 0 |
| (E) 0.5 | 1 | 70+ | 50 |
| (F) 1.0 | 1 | 80 | 100 |

¹ None.

The same samples showed the following dry soil repellency:

Sample: Percent reflectance ¹
- A ———————————————————————— 40
- B ———————————————————————— 39
- C ———————————————————————— 34
- D ———————————————————————— 45
- E ———————————————————————— 48
- F ———————————————————————— 45

¹ Reflectance of the samples after being tumbled for 30 minutes with 10% by weight of a dry synthetic particulate soil.

While no official test has been recognized for evaluations of dry soil, it was found that the procedure given below employing a standard synthetic dry soil described hereinafter provided comparable results.

Fifteen to twenty 6" x 8" size specimens (normally 80 x 80 cotton), including at least one untreated control, are tumbled for 30 minutes with 10% Cyanamid Soil based on weight of the fabric The Cyanamid Soil is prepared by the method described by Salisbury et al. in an article entitled "Soil Resistant Treatment of Fabrics," American Dyestruff Reporter, March 26, 1956, page 199. The soil had the following composition:

| Material: | Percent by weight |
|---|---|
| Peat Moss | 38 |
| Cement | 17 |
| Kaolin Clay, Peerless (R. T. Vanderbilt) | 17 |
| Silica 200 Mesh (Davidson Chem.) | 17 |
| Molacco Furnace Black (Benny & Smith Co.) | 1.75 |
| Red Iron Oxide (C. K. Williams Co.) | 0.50 |
| Mineral Oil | 8.75 |

The dry ingredients are blended thoroughly, dried in a forced draft convection oven for 8 hours at 50° C., then milled 25 hours with ceramic balls and stored in a polyethylene bag.

The tumbling is carried out in the 5 liter capacity Five Minute Homer Cleaner at 44 r.p.m.; six No 8 Neoprene rubber stoppers are distributed among the specimens to increase mechanical action. At the end of tumbling, the specimens are removed and each shaken up and down 15 times by hand to remove surface dirt.

The specimens are then cut in two (to produce two 4" x 6" pieces). One half is laundered with 50 grams of "FAB" a commercial detergent in a cotton cycle with a 5 pound dummy load in an automatic home washing machine, then hung to dry and lightly ironed under a clean cotton cloth.

The degree of soil is determined by measuring the light reflectance with a Photovolt Reflectance Meter (Tri Blue Filter). The average of six readings per specimen is used.

EXAMPLE 4

Example 1 is repeated using an equal weight of the following acrylic polymer dispersions:
(A) 1H,1H-perfluorobutyl acrylate.
(B) 1H,1H-perfluorobutyl methacrylate.
(C) 1H,1H-perfluoroheptyl acrylate.
(D) 1H,1H-perfluorononyl acrylate.
(E) perfluoro cyclohexyl acrylate.
(F) 1H,1H,2H,2H-heptadecafluordecyl acrylate.
(G) perfluorocyclohexyl methacrylate.
(H) 1H,1H,3H-perfluoroctyl methacrylate.
(I) perfluorotetrahydrofurfuryl methacrylate.
(J) 1H,1H,7H-perfluoroheptyl methacrylate.
(K) pentadecylfluoro-octyl acrylate.

EXAMPLE 5

Example 2 is repeated except that in place of 7.5% aluminum acetate the following salts and concentrations are used:
(A) 3% aluminum acetate.
(B) 1% aluminum acetate.
(C) 0.5% aluminum acetate.
(D) 0.35% aluminum acetate.

Each sample of treated fabric is heated for 5 minutes at 300° F. The results are comparable to the same treatment in Example 2.

EXAMPLE 6

Example 3 is repeated employing 0.3% fluorochemical and 2.7% aluminum salt. The results are comparable to Example 3F.

EXAMPLE 7

Example 6 is repeated using the fluorochemicals of Example 4. Excellent results are obtained.

While in the foregoing examples, the invention herein has been described in terms of certain specific combinations of the critical components of the compositions of this invention, it is to be clearly understood that any and all species within the genus of the substances disclosed herein may be used with equally outstanding results obtaining. Thus, while only certain specific weak acids have been discussed and exemplified, it is clear that other acids within the scope of the definition of the acids which may be used are contemplated. Such additional acids include: chloracetic, citric, propionic, glycine, maleic, malonic, glutaric, citraconic, citramalic, n-butyric, and the like. Most preferred water soluble acids are those which are miscible with water in all proportions, or at least soluble to the extent of about 10%.

While the present invention has been described by means of the foregoing examples, reference should be had to the appended claims for a full definition of the scope of the invention.

I claim:
1. A composition particularly adapted for rendering materials repellent to wetting and staining and resistant to soiling by particulate soils which comprises a mixture of from one to nine parts by weight of a polyvalent metal salt of a water-soluble weak acid having an ionization constant of $1 \times 10^{-2}$ to $1 \times 10^{-10}$ and from one to nine parts by weight of a perfluoro acrylic based emulsion polymer represented by the formula

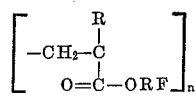

where R is selected from the group consisting of hydrogen and methyl, RF is selected from the group consisting of fluoroalkyl of $C_4$ to $C_{30}$, fluoroalkaryl, fluorocycloalkyl and fluoroaryl radicals and $n$ is an integer of 10 to 1000, wherein at least 70% of the hydrogen atoms have been replaced by fluorine atoms.

2. A composition as defined in claim 1, wherein the ratio of the emulsion polymer to the metal salt is at least 1:1 by weight.

3. A composition as defined in claim 1, wherein the polyvalent metal is aluminum.

4. A composition as defined in claim 1, wherein the polyvalent metal is zirconium.

5. A composition as defined in claim 3, wherein the metal salt is aluminum acetate.

6. A composition as defined in claim 3, wherein the metal salt is aluminum formate.

7. A composition as defined in claim 3, wherein the metal salt is aluminum chlorhydroxide.

8. A composition as defined in claim 4, wherein the salt is zirconium acetate.

9. A composition as defined in claim 4, wherein the salt is zirconium oxychloride.

10. A composition as defined in claim 1, wherein the polymer is perfluorooctyl acrylate.

11. A composition as defined in claim 1, wherein the polymer is perfluorooctyl methacrylate.

12. An aqueous bath for imparting water, stain and oil repellency and resistance to soiling by particulate soils to textile material containing from 1 to 20% of the composition as defined in claim 1.

13. A composition as defined in claim 12, wherein the polymer content is from 1 to 10% and the metal salt content is from 1 to 10%.

14. A composition as defined in claim 13, wherein the polymer is perfluorooctyl acrylate and the metal salt is aluminum acetate.

15. A dried textile fabric rendered water, oil and stain repellent and resistant to soiling by particulate soils by treatment with a composition as defined in claim 1.

16. A dried textile fabric rendered water, oil and stain repellent and resistant to soiling by particulate soils by treatment with and subsequent drying of a composition as defined in claim 12.

17. A process for rendering materials repellent to wetting, soiling and staining and resistant to soiling by particulate soils which comprises treating said material with a composition as defined in claim 12 and thereafter drying said treated materials to render the surfaces thereof repellent.

18. A process as defined in claim 17, wherein the materials are dried at a temperature from room temperature to about 400° F. and for a time from about one hour to thirty seconds.

19. A composition as defined in claim 1 wherein the polyvalent metal is selected from the class consisting of aluminum, chromium, cobalt, copper, zinc and zirconium.

20. A dry textile fabric rendered water, oil and stain repellent and resistant to soiling by particulate soils by treatment with a composition as defined in claim 19.

21. A process for rendering materials repellent to wetting, soiling and staining and resistant to soiling by particulate soils which comprises treating said material with a composition as defined in claim 19 and thereafter drying said treated materials to render the surfaces thereof repellent.

References Cited
UNITED STATES PATENTS 2,891,874   6/1959   Aarons et al. _____ 106—287
3,068,187   12/1962   Bolstad et al.

MURRAY TILLMAN, Primary Examiner
W. J. BRIGGS, Sr., Assistant Examiner

U.S. Cl. X.R.
117—135.5, 121; 260—89.5, 86.1